United States Patent
Tran

(10) Patent No.: US 7,756,191 B2
(45) Date of Patent: Jul. 13, 2010

(54) DECONVOLUTION SEARCHER FOR WIRELESS COMMUNICATION SYSTEM

(75) Inventor: Jean-Marie Tran, San Diego, CA (US)

(73) Assignee: Nokia Corporation, Espoo (FI)

( * ) Notice: Subject to any disclaimer, the term of this patent is extended or adjusted under 35 U.S.C. 154(b) by 520 days.

(21) Appl. No.: 10/743,851

(22) Filed: Dec. 22, 2003

(65) Prior Publication Data

US 2005/0135461 A1    Jun. 23, 2005

(51) Int. Cl.
*H04B 1/69* (2006.01)
(52) U.S. Cl. .................... 375/148; 375/152
(58) Field of Classification Search .......... 375/130, 375/137, 147, 148, 348, 140, 143–144, 152, 375/267, 285, 316, 343, 346–347; 370/342, 370/290–291, 320, 335, 441; 455/506, 213, 455/306–308; 708/315, 323, 400, 420–422, 708/813, 819–820
See application file for complete search history.

(56) References Cited

U.S. PATENT DOCUMENTS

| | | | | |
|---|---|---|---|---|
| 4,095,225 | A * | 6/1978 | Erikmats | 342/195 |
| 6,002,727 | A * | 12/1999 | Uesugi | 375/346 |
| 6,144,691 | A * | 11/2000 | Kenney | 375/130 |
| 6,177,907 | B1 * | 1/2001 | Golovin et al. | 342/458 |
| 6,269,075 | B1 * | 7/2001 | Tran | 370/206 |
| 6,522,683 | B1 * | 2/2003 | Smee et al. | 375/144 |
| 6,570,909 | B1 * | 5/2003 | Kansakoski et al. | 375/148 |
| 6,628,728 | B1 * | 9/2003 | McCarty, Jr. | 375/296 |
| 6,674,815 | B2 * | 1/2004 | Zangi | 375/340 |
| 6,680,727 | B2 * | 1/2004 | Butler et al. | 375/144 |
| 6,792,031 | B1 * | 9/2004 | Sriram et al. | 375/147 |
| 6,792,035 | B2 * | 9/2004 | Kontola | 375/148 |
| 6,862,326 | B1 * | 3/2005 | Eran et al. | 375/343 |
| 7,391,803 | B2 * | 6/2008 | He et al. | 375/142 |
| 2001/0028677 | A1 * | 10/2001 | Wang et al. | 375/148 |
| 2002/0106039 | A1 | 8/2002 | Sugita | 375/343 |
| 2003/0165187 | A1 * | 9/2003 | Tesfai et al. | 375/219 |
| 2003/0235237 | A1 * | 12/2003 | Smolyar | 375/148 |
| 2004/0151238 | A1 * | 8/2004 | Masenten | 375/219 |
| 2004/0213363 | A1 * | 10/2004 | Bottomley et al. | 375/343 |
| 2004/0223540 | A1 * | 11/2004 | Shan | 375/150 |
| 2004/0229637 | A1 * | 11/2004 | Wang et al. | 455/506 |
| 2005/0094713 | A1 * | 5/2005 | Yellin | 375/148 |
| 2006/0193294 | A1 * | 8/2006 | Jorswieck et al. | 370/334 |

OTHER PUBLICATIONS

Interim Guidelines for Examination of Patent Applications for Patent Subject Matter Elgibility, pp. 50-56.*
"AVO And The General Inverse Theory", Guillaume Cambois, CSEG Recorder, Jun. 2001, pp. 74-77.
"Optimum Receivers For The Additive White Gaussian Noise Channel", John G. Proakis, Digital Communications Third Edition, 1995, pp. 233-249.
"Optimum threshold Detection: The Binary Case", B.P. Lathi, Modern Digital and Analog Communication Systems Section Edition, 1989, pp. 510-524.

* cited by examiner

*Primary Examiner*—Tesfaldet Bocure
*Assistant Examiner*—Lawrence B Williams
(74) *Attorney, Agent, or Firm*—Harrington & Smith

(57) ABSTRACT

Disclosed is a method, an apparatus and a mobile station embodiment to receive a CDMA signal from a radio channel. The method includes inputting a CDMA signal received through the radio channel to a searcher and processing the received signal in the searcher to obtain a multi-path profile of the radio channel. Processing includes at least partially removing an effect of at least one of a transmit and a receive filter on the multi-path profile. In one embodiment at least partially removing the effect of at least one of the transmit and receive filter on the multi-path profile involves passing the received CDMA signal through an N-tap Finite Impulse Response filter having a filter characteristic that approximates an inverted amplitude response of the at least one of the transmit and a receive filter, while in another embodiment software external to the searcher is used to process the searcher output data.

37 Claims, 4 Drawing Sheets

$$F = \begin{bmatrix} f_k & \ldots & f_{2k+1} & 0 & 0 & \ldots & 0 & 0 & 0 \\ f_{k-1} & \ldots & f_{2k} & f_{2k+1} & 0 & \ldots & 0 & 0 & 0 \\ f_{k-2} & \ldots & f_{2k-1} & f_{2k} & f_{2k+1} & \ldots & 0 & 0 & 0 \\ \ldots & \ldots & \ldots & \ldots & \ldots & \ldots & \ldots & \ldots & \ldots \\ 0 & \ldots & 0 & 0 & 0 & f_0 & \ldots & f_{k-1} & f_k \end{bmatrix}$$

DECONVOLUTION SEARCHER FOR WIRELESS COMMUNICATION SYSTEM

TECHNICAL FIELD

This invention relates generally to wireless communications systems and receivers and, more specifically, relates to pseudo-noise (PN) code searchers used in code division multiple access (CDMA) communications systems, such as those that include mobile stations, such as cellular telephones, and related infrastructure equipment, such as base stations.

BACKGROUND

In a CDMA system, such as a cdma2000/IS2000 system or Wideband CDMA (WCDMA) system, a searcher element is used in the mobile station receiver demodulator for acquisition, set maintenance and control of the demodulating element, also referred to as finger assignment. In the Idle State or in the Traffic State, the searcher derives multi-path amplitude profiles corresponding to the Active, Candidate and Neighbor base stations. A mobile station controller uses the derived multi-path amplitude profiles to assign demodulator fingers in order to demodulate and combine the signals received from the strongest ones of the multi-paths.

In accordance with conventional operation the searcher derives multi-path profiles by correlating the incoming signal with a replica of the PN sequence over a number of PN time offset hypotheses. Typically, the searcher produces a two sample/chip multi-path profile. This profile corresponds to the amplitude of the complex correlation of the incoming data with the PN replica over a certain correlation length at two samples/chip.

It should be noted that the reference to amplitude implies a magnitude calculation. The multi-path profile is typically implemented as an amplitude profile because the bit width of the information to transfer from the searcher hardware to the DSP/general processor is reduced. Note that instead of the amplitude or magnitude of the complex correlation, one could use the power or magnitude squared of the complex correlation, as shown in the prior art searcher embodiment of FIG. 2.

In general, the multi-path profile is the result of a convolution of the base station signal with a radio channel, the base station transmit filter and the mobile station receive filter. That is, a conventional searcher produces the multi-path profile using a convolution of the transmit/receive filters and the radio channel. The Active Set profile generated by the searcher is then used by the controller to assign the fingers to demodulate the incoming CDMA signal.

However, if the multi-path profile data is compromised, such as by the presence of excessive noise or artifacts (such as sidelobe peaks) in the profile data, there exists a potential that the controller will assign fingers incorrectly to some PN offset, whereby the overall demodulation performance of the receiver is degraded. Further, when artifacts are present they are also processed by the finger assignment algorithm, thereby increasing the overall complexity without deriving any additional benefit.

SUMMARY OF THE PREFERRED EMBODIMENTS

The foregoing and other problems are overcome, and other advantages are realized, in accordance with the presently preferred embodiments of these teachings.

This invention relates to searcher technology for a receiver operating in accordance with a CDMA standard, such as cdma2000 or WCDMA. The invention is relevant to a base station receiver and to a mobile station receiver, although it is described below primarily in the context of a mobile station receiver. A searcher uses a deconvolution technique to at least partially remove the blurring effect of the transmitter and receiver filters so that the searcher produces substantially only the radio channel multi-path profile.

In one aspect this invention provides a method to receive a CDMA signal from a radio channel, and the method includes inputting a CDMA signal received through the radio channel to a searcher and processing the received signal in the searcher to obtain a multi-path profile of the radio channel, where processing includes at least partially removing an effect of at least one of a transmit and a receive filter on the multi-path profile.

In one embodiment at least partially removing the effect of at least one of the transmit and receive filter on the multi-path profile involves passing the received CDMA signal through an N-tap Finite Impulse Response filter having a filter characteristic that approximates an inverted amplitude response of the at least one of the transmit and a receive filter. The filter taps of the FIR filter may be derived in several different manners.

For example, in one embodiment a least squares criterion can be used to derive the radio channel multi-path profile x from a searcher profile y, where $y = F \cdot x + v$, where v is a noise vector and F is a transmit/receive matrix.

The invention can be practiced primarily by searcher hardware (circuitry), or it can be practiced primarily by computer software, such as software executed by a mobile station Digital Signal Processor (DSP) or executed by a mobile station general purpose data processor.

Apparatus for practicing the method is also disclosed, as is a mobile station that is constructed and operated in accordance with the invention to have a receiver adapted to receive a CDMA signal from a radio channel. The receiver includes a receiver front end for receiving the CDMA signal from the radio channel. The receiver front end includes at least one receiver filter and, in accordance with this invention, a searcher having an input coupled to an output of the receiver front end for inputting a received signal and an output for outputting a digital representation of a radio channel multi-path profile to a mobile station control function, such as a DSP or a general purpose data processor. In one embodiment the searcher includes a hardware unit for processing the received signal to at least partially remove an effect of at least said receiver filter on the multi-path profile, and to possibly also at least partially remove an effect of a base station transmitter filter on the multi-path profile. In another embodiment the effect of the receiver/transmitter filter is removed in software by operating on the conventional multi-path profile that is output from the searcher.

Also disclosed is a method to reduce an amount of data provided to a finger assignment algorithm. The method includes inputting a CDMA signal received through a radio channel to a searcher, and processing the received signal in the searcher to generate output data for the finger assignment algorithm that represents a multi-path profile of the radio channel. Processing includes passing the received CDMA signal through a filter selected to have a filter characteristic that approximates an inverted response of at least one of a base station transmit filter and at least one mobile station receive filter so as to reduce an occurrence of multi-path sidelobes in the output data.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 4a shows an example of a multi-path profile from the radio channel, FIG. 4b shows a combined transmitter/receiver filter response, and FIG. 4c shows the convolution of the multi-path profile from the radio channel and the combined transmitter/receiver filter response, which corresponds to the multi-path profile measured by a conventional searcher unit, such as the one shown in FIG. 2.

DETAILED DESCRIPTION OF THE PREFERRED EMBODIMENTS

Figure 1:
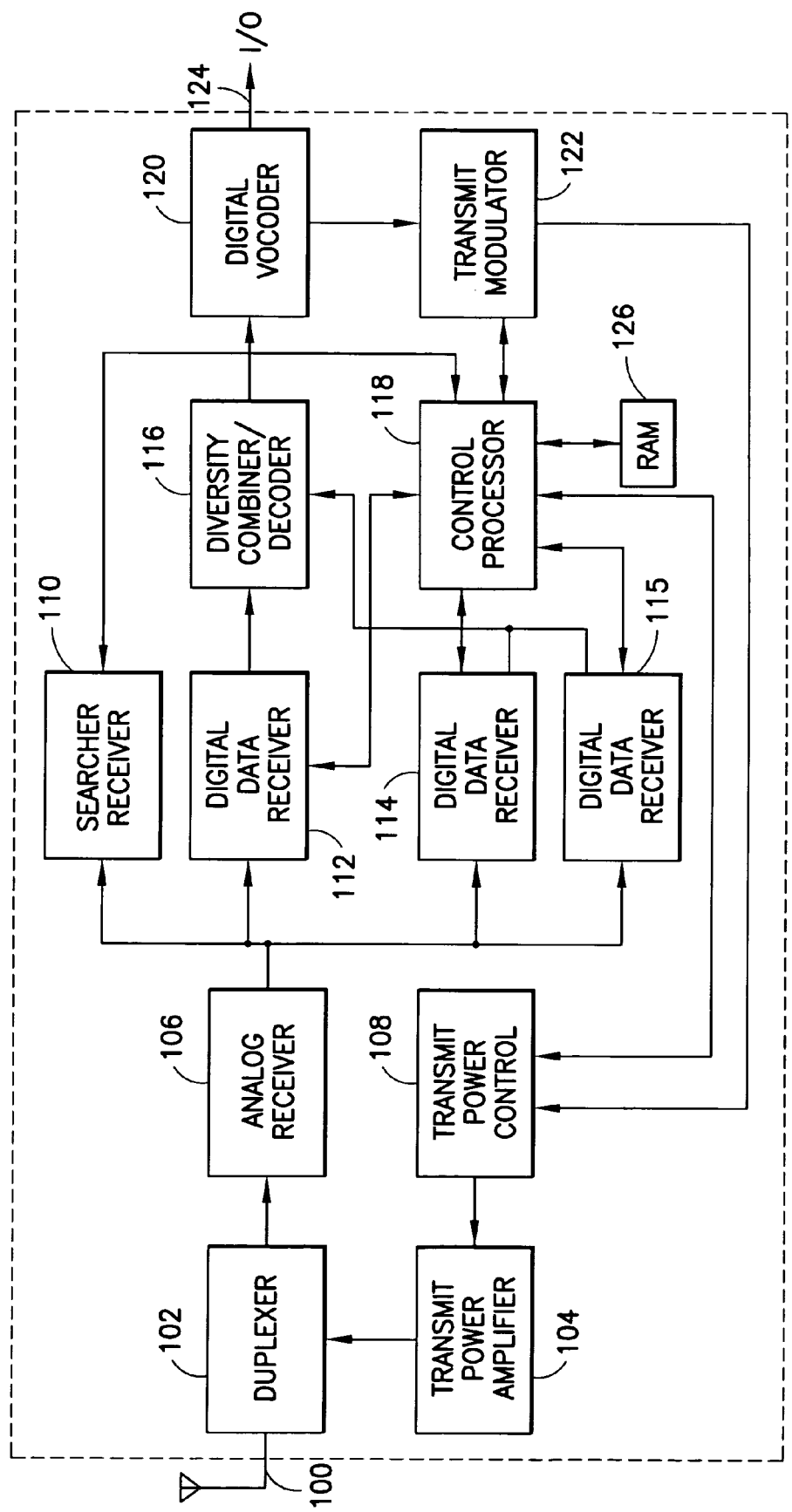
FIG. 1 is a simplified block diagram of a mobile station that is suitable for practicing this invention.

FIG. 1 is a block diagram showing portions of a mobile station 130 that includes a searcher/receiver 110 that is constructed and operated according to embodiments of the invention. Reference with regard to the overall exemplary mobile station 130 architecture shown in FIG. 1 can be made to commonly assigned U.S. Pat. No. 6,144,691, "Method and Apparatus for Synchronizing to a Direct Sequence Spread Spectrum Signal", by Thomas Kenney. The exemplary mobile station 130 architecture includes an antenna 100, a duplexer 102, a transmit power amplifier 104, an analog receiver 106, a transmit power controller 108, the searcher/receiver 110, a first digital data receiver 112, a second digital data receiver 114, a third digital data receiver, a diversity combiner/decoder 116, a control processor 118, a RAM 126, a digital vocoder 120, a transmit modulator 122 and a user interface 124.

The antenna 100 is coupled to the analog receiver 106 through duplexer 102. Signals received at antenna 100 are input to analog receiver 106 through duplexer 102. The received signals are converted to an IF frequency and then filtered and digitized in analog receiver 106 for input to the digital data receiver 112, digital data receiver 114 and searcher/receiver 110. The digitized IF signal input to digital data receiver 112, digital data receiver 114 and searcher/receiver 110 may include signals from many ongoing calls, together with the pilot carriers transmitted by the base station of the cell site in which the mobile station is currently located, plus the pilot carriers transmitted by the base stations in all neighboring cell sites. Digital data receiver 112, digital data receiver 114, and digital data receiver 115 perform a correlation on the IF signal with a PN sequence of a desired received signal. The output of digital data receivers 112, 114 and 115 is a sequence of encoded data signals from three independent paths.

Searcher/receiver 110 searches the pilot channel PN phase offset space for pilot channel signals transmitted from a base station. Searcher/receiver 110 is also used to search for other signals transmitted from different base stations. Searcher/receiver 110 generates correlation results for a desired waveform and generates signals to control processor 118 indicating the correlation results of the searched signals.

The encoded data signals output from digital data receivers 112, 114 and 115 are input to the diversity combiner/decoder 116. In diversity combiner/decoder 116 the encoded data signals are aligned and combined, the resultant data signal is then decoded using error correction, and is then input to digital vocoder 120. Digital vocoder 120 outputs information signals to the user interface 124. The user interface 124 may be a handset with a keypad or another type of user interface, such as a laptop computer monitor and keyboard.

For transmission of signals from mobile station 130, a signal received at user interface 124 is input to user digital vocoder 120 in digital form, as for example, data or voice that has been converted to digital form at user interface 124. In digital vocoder 120 the signal is encoded and output to transmit modulator 122. Transmit modulator 122 Walsh encodes the signal and then modulates the Walsh encoded signal onto a PN carrier signal, with the PN carrier sequence being the PN carrier sequence of the CDMA channel to which the mobile station is assigned. The PN carrier information is transmitted to mobile station 130 from the telecommunications system and transferred to control processor 118 from digital data receivers 112 and 114. Control processor 118 sends the PN carrier information to transmit modulator 122. A PN modulated signal is output from transmit modulator 122 to transmit power control 108. Transmit power control 108 sets the level of the transmission power of mobile station 130 according to commands received from control processor 118. The power control commands may be generated by control processor 118 according to commands received from the system, or may be generated by software of control processor 118, according to predetermined criteria, in response to data received from the system through digital data receivers 112, 114 and 115. The modulated signal is then output from transmit power control 108 to transmit power amplifier 104 where the signal is amplified and converted to an RF carrier frequency signal. The RF carrier frequency signal is then output from power amplifier 104 to duplexer 102 and transmitted from antenna 100 to the base station (not shown).

Figure 2:
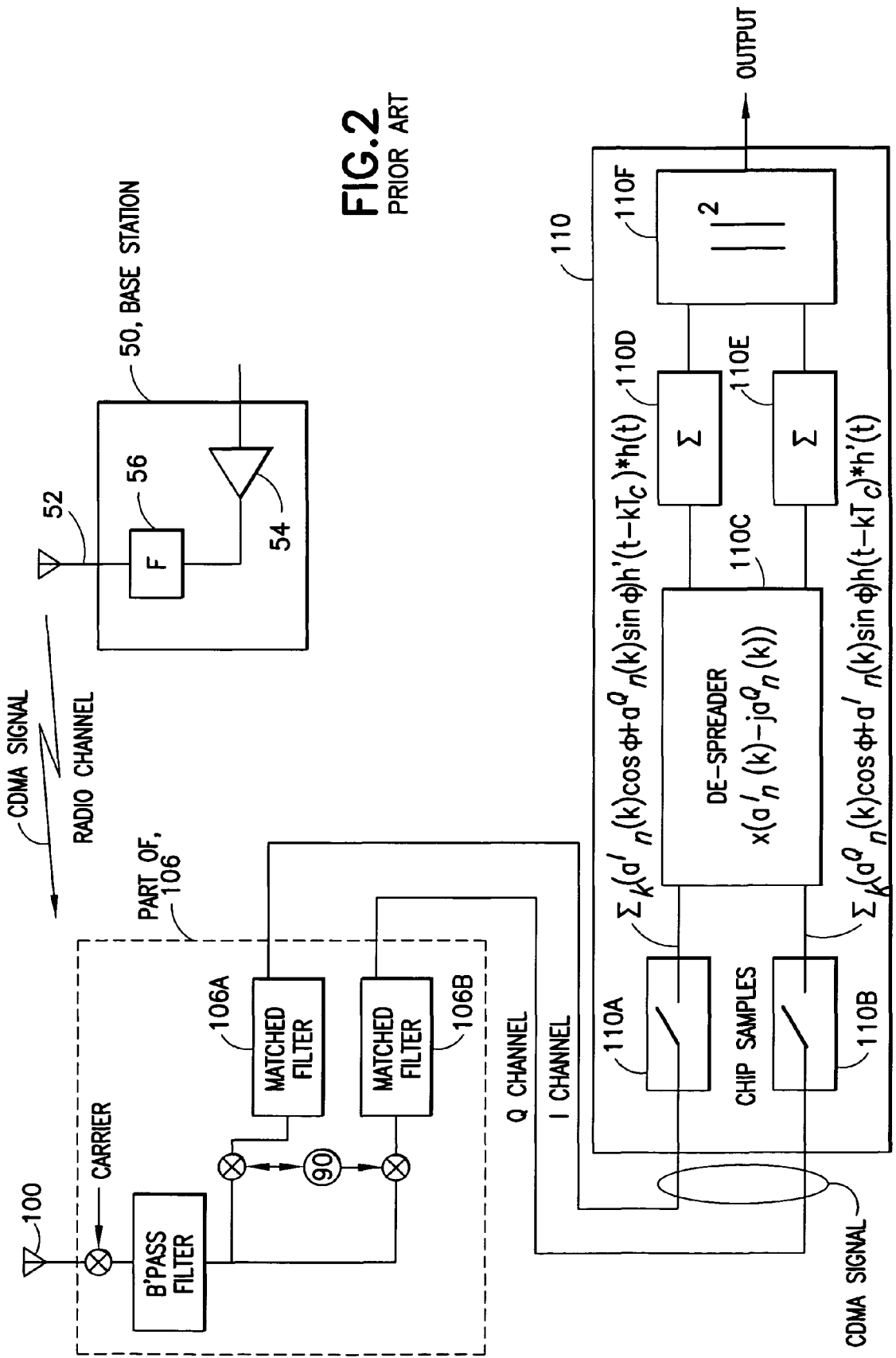
FIG. 2 illustrates a prior art searcher unit, in combination with a portion of an analog receiver of the mobile station.

For reference purposes, FIG. 2 shows a block diagram of a conventional searcher unit that could be used to implement the searcher/receiver 110 of FIG. 1 in a conventional mobile station 130. Reference with regard to this conventional searcher architecture can be made to commonly assigned U.S. Pat. No. 6,269,075 B1, "Finger Assignment in a CDMA RAKE Receiver", by Jean-Marie Tran (the named inventor of this patent application). The searcher unit 110 includes a search engine element having in-phase (I) and quadrature-phase (Q) samplers 110A and 110B, respectively, a de-spreader element 110C, I and Q accumulators 110D and 110E, respectively, and a magnitude squaring unit 110F. Note that the magnitude squaring unit 110F could be replaced by a simple magnitude calculation unit so that the prior art searcher can produce either the magnitude squared (the power profile) or the magnitude (the amplitude profile) of the radio channel.

If one assumes perfect match filtering with I and Q matched filters 106A, 106B, that form part of the analog receiver 106 of FIG. 1 (also referred to herein as the receiver front end), the I and Q signal inputs to de-spreader element 110C have the form shown in FIG. 2, wherein h'(t) is the impulse response of the matched filters 106A, 106B. The de-spreader element 110C is a complex de-spreader that multiplies each chip sample by the term shown in FIG. 2. Letting $H(t-kT_c)=h(t-kT_c)*h'(t)$, then the signal output from the accumulators 110D and 110E (neglecting interference terms) is $N_cH(delay)e^{-j\phi}$, where delay is a small delay in the generated PN timing in the complex de-spreader 110C. The magnitude squaring unit 110F (or magnitude unit, in the amplitude embodiment referred to above) eliminates the arbitrary initial phase such that the output measurements from the searcher unit 110 are proportional to $H(delay)^2$. The searcher unit 110 may measure the multipath environment with 1/½ chip resolution to avoid unacceptable signal loss due to sampling errors. Also shown in FIG. 2 is a base station 50 having an antenna 52, a transmitter 54 and a transmitter filter 56 for transmitting a CDMA signal through a radio channel.

Figure 3A:
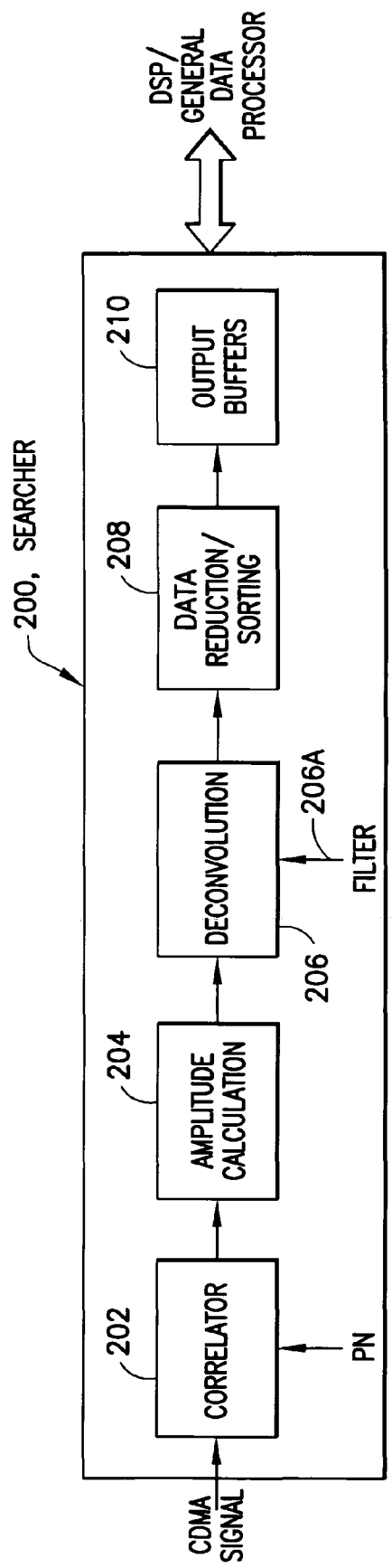
FIG. 3A is a block diagram of a searcher unit that includes a deconvolution processor block in accordance with this invention.

FIG. 3A illustrates a searcher unit 200 in accordance with this invention. The searcher unit 200 receives the CDMA signal that is applied to a correlator 202 that also receives the PN signal. The output of the correlator 202 is applied to an amplitude calculation block 204. In accordance with an embodiment of this invention, the output of the amplitude calculation block 204 is applied to a deconvolution processing block 206 that also receives a filter signal 206A. The output of the deconvolution processing block 206 is applied to a data reduction/sorting block 208, and thence to output buffers 210 that are readably coupled to a digital signal processor (DSP) and/or a general data processor of the mobile station or the base station, depending on where the CDMA receiver that employs this invention is used.

Discussing FIG. 3A now in further detail, the correlator 202 may be a conventional correlator capable of performing coherent integration for a given number of chips. Note that another suitable conventional correlator implementation uses additional non-coherent integration after the magnitude or magnitude squared block. In block 204 the amplitude is derived, that is, block 204 computes the magnitude of the complex correlation: |correlation|=square root (real part*real part+imag part*imag part). Block 208 typically reduces the data transfer from the ASIC, that contains the illustrated circuitry, to the DSP. In one implementation the block 208 performs a partial sorting of the data and reduces the profile to include only the 16 or 32 highest amplitude data points. In addition to the amplitude, block 208 keeps track of the PN offsets of the values selected. Block 208 may also include peak finder circuitry, that is, block 208 could also include means to identify and provide the PN and the amplitude of the arrival peaks. The Filter input 206A conveys a set of N coefficients which are the taps of the filter, such as the N-tap FIR filter. What is filtered by the FIR filter is the raw amplitude profile derived by the searcher.

Since it may be reasonably assumed that the receive filtering response of the matched filters 106A and 106B (FIG. 2), or filters that, once implemented, are an approximation of the matched filters 106A, 106B, is approximately known, in accordance with an aspect of this invention the transmit and receive filtering response can be removed from the multi-path amplitude profile using the deconvolution processing block 206. As a result, instead of observing the convolution of the discrete CDMA signal arrivals from the radio channel and a combined transmitter/receiver filter response, the discrete radio channel arrival paths alone can be recovered from the received CDMA signal.

FIG. 4a shows an example of a multi-path profile from the radio channel, FIG. 4b shows a combined transmitter/receiver filter response, and FIG. 4c shows the convolution of the multi-path profile from the radio channel and the combined transmitter/receiver filter response, which corresponds to the multi-path profile measured by a conventional searcher unit, such as the searcher unit 110 shown in FIG. 2.

The deconvolution searcher 200, in accordance with this invention, produces (approximately) the multi-path profile shown in FIG. 4a, as opposed to the multi-path profile shown in FIG. 4c, since the "blurring" function of the combined transmitter/receiver filter response of FIG. 4b is essentially removed.

There are a plurality of embodiments that can be used to realize the deconvolution processing unit 206 of the deconvolution searcher 200. What follows are descriptions of two primarily hardware embodiments, and one primarily software embodiment. These various embodiments are not intended, however, to be read in an limiting sense upon the practice of the teachings of this invention.

Figure 3B:
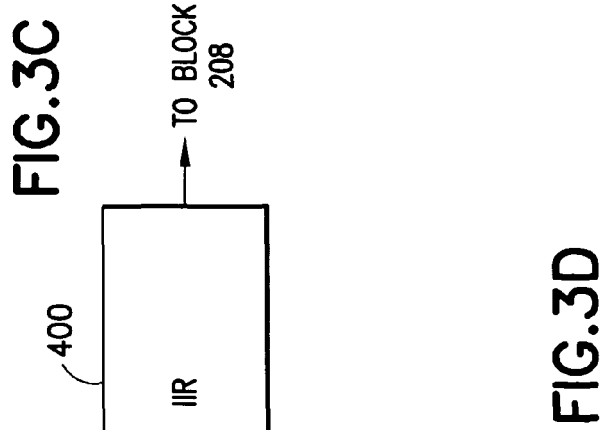
FIG. 3B shows an N-tap FIR filter embodiment of the deconvolution processor block of FIG. 3A.
Figure 3C:
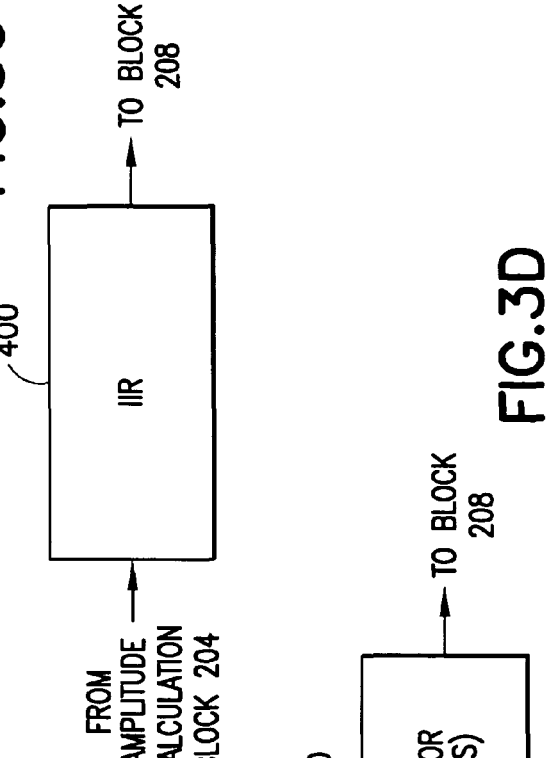
FIG. 3C shows an IIR filter embodiment of the deconvolution processor block of FIG. 3A.

In general, in one hardware embodiment the deconvolution processor block 206 is implemented as an N-tap Finite Impulse Response (FIR) filter 300, shown in FIG. 3B, and in another hardware embodiment shown in FIG. 3C the deconvolution processor block 206 is implemented as an Infinite Impulse Response (IIR) filter 400 (having a number of taps at the numerator and at the denominator). The derivation of the filter taps for either of these embodiments can be performed in a variety of ways. For example, one suitable technique is to generate an inverse filter of the a-priori known convolution of the transmit and receive filter. Note in this regard that the transmit filter 56 model in the base station 50 may be a filter specified by the IS-95 CDMA standard, while the receive filter is preferably the actually implemented receive filter, or model of the receive filter.

In the FIR filter 300 embodiment the amplitude response of the transmit/receive filters, such as the matched receive filters 106A, 106B and the corresponding base station transmit filter 56, is inverted and the resulting inverse filter is approximated by the N-tap FIR filter 300 shown in FIG. 3B. The FIR filter 300 is used to filter the PN-series generated by the searcher 200 (the output of correlator 202 via the amplitude (or power) calculation block 204). The FIR data need be provided by the control processor 118, such as by the DSP, but once as a fixed model of the blurring function (e.g., that corresponding to FIG. 4b). For example, the FIR filter 300 is the inverse of the convolution of a model of at least one of, and preferably both of, the base station transmit filter 56 (such as the transmit FIR filter defined in the IS-95 standard) and the mobile station receiver filters 106A, 106B. Note that the model of the mobile station 130 receiver filter may actually be the convolution of several filters, partitioned in accordance with the specific architecture of the receiver (e.g., analog baseband filter/digital filter), and may or may or may not include a fixed equalizer.

Figure 3D:
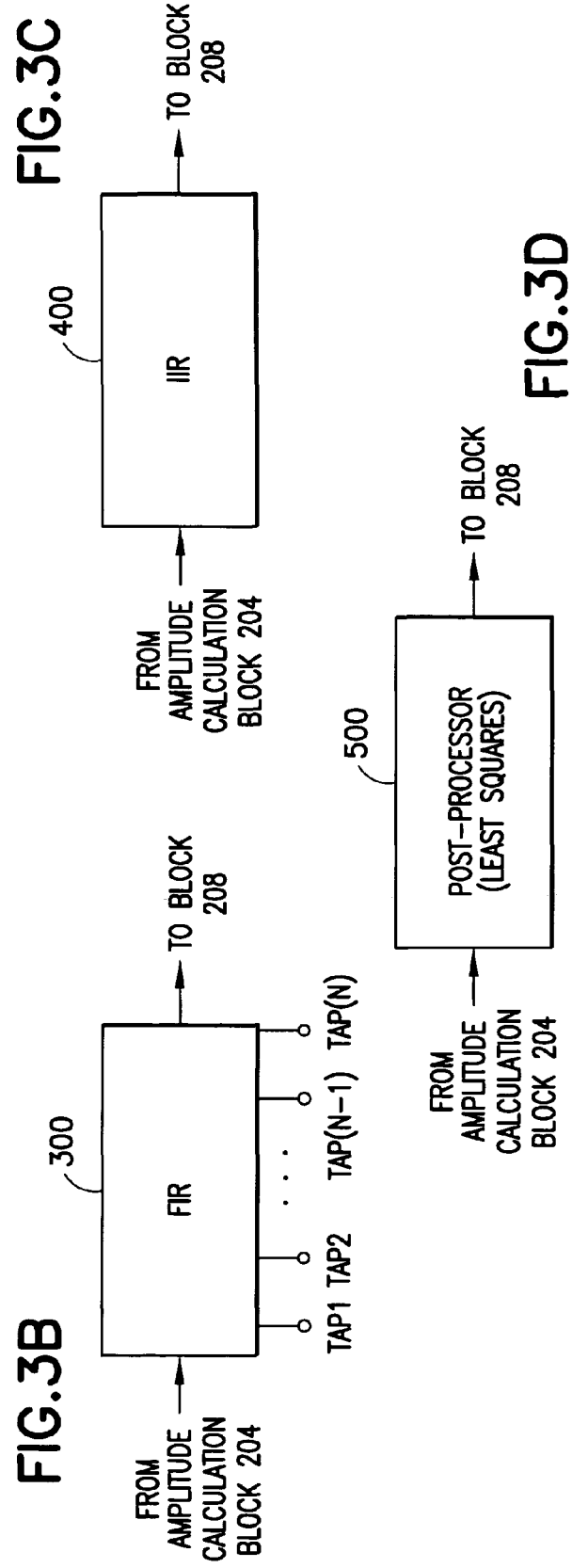
FIG. 3D shows a post-processor, least squares embodiment of the deconvolution processor block of FIG. 3A.

In an alternate embodiment shown in FIG. 3D a post-processor unit 500 operates on the profile output from block 204, and uses a least-squares criterion to derive the radio channel multi-path profile x from the searcher profile y, where y=F·x+v, where v is a noise vector and F is a transmit/receive matrix. In this embodiment the actual operation that is performed is a matrix multiplication, that is, x is derived from y by a relationship x=R·y. R is preferably derived through least squares, and can be fixed and computed off-line.

Figures 4, 5:
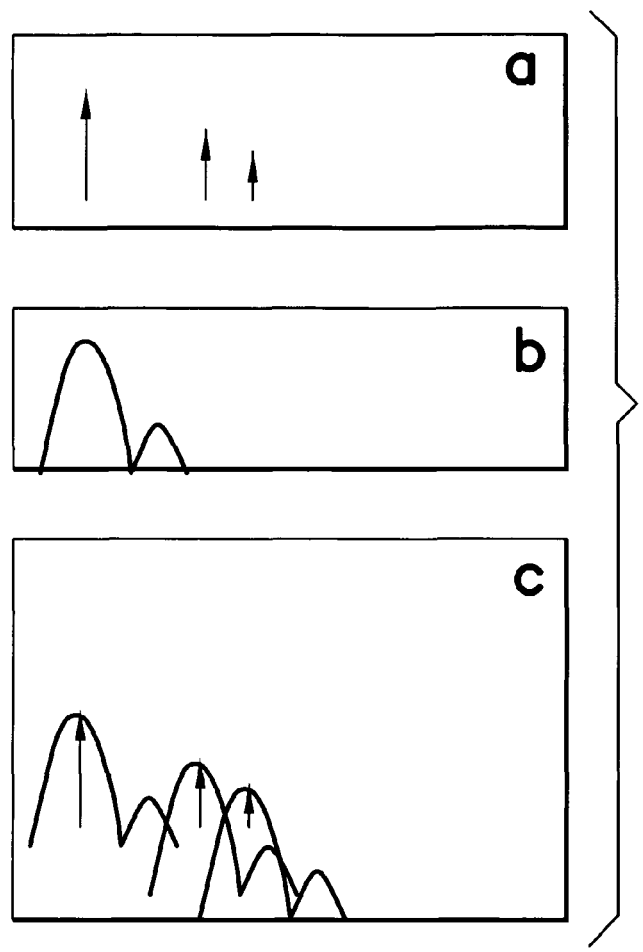
FIG. 5 shows an embodiment of a transmit/receive matrix F.

Assuming that the blurring function has a span of 2k+1 samples, and is given by f0, f1, ..., f2k+1, the transmit/receive matrix F has the form shown in FIG. 5.

The least squares criterion is to minimize the L2 norm of the vector v, and the problem then becomes one of finding x so that $\|y-F\cdot x\|^2$. The vector x may be derived as $x=(F^T\cdot F)^{-1}\cdot F^T\cdot y$, where T denotes a transpose operation and −1 denotes an inverse matrix operation. Note that the matrix=$(F^T \cdot F)^{-1} \cdot F^T$ is preferably computed off-line and stored. A pre-whitening term may be added to stabilize the inverse with the solution $x=(F^T \cdot F+\text{epsilon} \cdot I)^{-1} \cdot F^T \cdot y$, where epsilon is a fixed number. Note that the matrix=$(F^T \cdot F+\text{epsilon} \cdot I)^{-1} \cdot F^T$ is also preferably computed off-line and stored. This second embodiment has the benefit of improved performance in a noisy environment.

A variation on this technique uses L1 norm instead of L2 norm in the least squares derivation, and thus finds x as the solution to the minimization problem of $\|y-F \cdot x\|$ (note that the vectors are real), where L1 norm $\|y-F \cdot x\|=\text{sigma}|v_n|$.

The third, essentially software embodiment is now described.

In a first step, and assuming a mobile station 130 embodiment of the invention, the searcher is commanded to search the desired Active Set member in a non-sorted mode. This particular Active Set member may be, for example, the serving sector for the Forward Packet Data Channel (F-PDCH) in IS2000 Release C or IS2000 Release D. In a second step, the data is retrieved from the searcher hardware to the control processor 118, such as to the DSP of the mobile station 130. In the third step one of the above-described deconvolution/filtering or post-processing embodiments (FIG. 3B, 3C or 3D) is implemented in the DSP software, as opposed to the searcher hardware. The resulting multi-path profile solution is then fed to the finger assignment process that also operates in the DSP. In this case the searcher can be conventional in construction, as the invention is implemented in software outside of the searcher. In the above-noted non-sorted mode of operation there is no data reduction, and the data returned is the raw data, either the magnitude or the magnitude squared multi-path profile at the 1/½ chip sampling (typical) interval. This is opposed to the sorted mode of operation, where the raw data is pre-processed such that, typically, the 16 or 32 largest amplitude/power and associated PN offsets are returned.

It is noted that the finger assignment process typically begins with a further reduction of the data returned by the searcher. That is, after the sort process the top 16 or top 32 amplitudes and corresponding PN offsets are available, from which the finger assignment module or algorithm needs to identify peaks that correspond to the multi-paths. These peaks may be filtered further, and the corresponding profiles are further processed to determine if there is a new path to assign a free finger to, or a new path that is stronger than a path currently being demodulated by a finger. When there is a strong multi-path present there may be sidelobes present as well that have the appearance of peaks, which can result an assignment of fingers to the sidelobes. One advantage of the deconvolution searcher 200 is that it can remove the sidelobe peaks or artifacts prior to the finger assignment module or algorithm, thereby minimizing a possibility that a finger will be assigned to a sidelobe.

Thus, in that there can be sidelobes in the combined response of the transmit and receive filters, the use of the searcher deconvolution processing block 206 makes it possible for the searcher 200 to pass to the sorting routine only the main radio channel paths. In either the hardware or software embodiments of this invention the control processor 118 that uses the sorted data is inhibited from assigning a demodulator finger to a sidelobe of a path, since the sidelobe(s) have been removed from the "raw" searcher output by the operation of the deconvolution processing block 206.

It can thus be noted that there additional data reduction is made possible by the use of this invention, since the operation of the deconvolution processor 206 serves to remove some "peaks" as the sidelobes of strong peaks, and thus these sidelobes do not find their way in to the finger assignment process.

It should be noted that there is no utility to be gained by assigning a finger to a sidelobe of a radio path, as there is no new information contained in the sidelobe. Actually, assigning a finger to a path and another to a sidelobe can create a performance degradation, since sidelobe sampling can result in a higher level of Inter-Chip Interference (ICI). The use of the searcher deconvolution processing block 206 can beneficially avoid the assignment of a finger to the sidelobe of a strong radio path, since the use of the searcher deconvolution processing block 206 makes it possible for the searcher 200 to pass to the sorting routine only the main radio channel paths.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. For example, and as was noted above, this invention can be used in downlink or forward receiver, such as in the mobile station receiver, or it can be used in the uplink or reverse receiver, such as in a base transceiver station or more simply base station. In addition, the deconvolution searcher of this invention will function with either type of multi-path profile, i.e., with one based on the amplitude or magnitude of the complex correlation, or one based on the power or magnitude squared of the complex correlation. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method, comprising:
   inputting a code division multiple access signal received through a radio channel to a searcher; and
   processing the received signal in the searcher to obtain a multi-path profile of the radio channel, where processing comprises at least partially removing an effect of a transmit filter and a receive filter on the multi-path profile, where at least partially removing comprises passing the received code division multiple access signal through a filter selected to have a filter characteristic that approximates an inverted amplitude or power response of the transmit filter and the receive filter.

2. A method as in claim 1, further comprising outputting the multi-path profile to a controller for use in making demodulator finger assignments.

3. A method, comprising:
   inputting a code division multiple access signal received through a radio channel to a searcher; and
   processing the received signal in the searcher to obtain a multi-path profile of the radio channel, where processing comprises at least partially removing an effect of at least one of a transmit filter or a receive filter on the multi-path profile, wherein said at least partially removing comprises passing the received code division multiple access signal through a processing unit that uses a least squares criterion to derive the radio channel multipath profile x from a searcher profile y, where y=F·x+v, where v is a noise vector and F is a transmit/receive matrix.

4. A method as in claim 3, where vector x is derived as x=$(F^T \cdot F)^{-1} \cdot F^T \cdot y$, where T denotes a transpose operation and −1 denotes an inverse matrix operation.

5. A method as in claim 4, further comprising adding a pre-whitening term to stabilize the inverse as x=$(F^T \cdot F + epsilon \cdot I)^{-1} \cdot F^T \cdot y$.

6. A method as in claim 3, using L1 norm instead of L2 norm in the least squares derivation.

7. A method as in claim 1, where at least partially removing is performed by searcher hardware.

8. A method as in claim 1, where at least partially removing is performed by a data processor that is external to the searcher.

9. An apparatus comprising:
a receiver front end configured to receive a code division multiple access signal from a radio channel; said receiver front end comprising at least one receiver filter; and
a deconvolution searcher block having an input coupled to an output of the receiver front end for inputting a received signal and an output for outputting a digital representation of a radio channel multi-path profile to a control function, said deconvolution searcher block comprising a unit configured to process the received signal to at least partially remove an effect of at least said receiver filter on the multi-path profile, the unit comprising a filter having a filter characteristic that approximates an inverted amplitude response of at least said receiver filter.

10. The apparatus as in claim 9, where said unit configured to process the received signal also at least partially removes an effect of a transmitter filter on the multi-path profile.

11. The apparatus as in claim 10, where said receiver is located at a mobile station, and where a transmitter comprising said transmitter filter is located at a base station.

12. The apparatus as in claim 10, where said receiver is located at a base station, and where a transmitter comprising said transmitter filter is located at a mobile station.

13. The apparatus as in claim 9, where said control function uses the multi-path profile when making demodulator finger assignments.

14. The apparatus as in claim 10, where said unit of said deconvolution searcher block comprises a filter having a filter characteristic that approximates an inverted response of said receiver filter and said transmitter filter.

15. An apparatus, comprising:
a receiver front end configured to receive a code division multiple access signal from a radio channel; said receiver front end comprising at least one receiver filter; and
a deconvolution searcher block having an input coupled to an output of the receiver front end for inputting a received signal and an output for outputting a digital representation of a radio channel multi-path profile to a control function, said deconvolution searcher block comprising a unit configured to process the received signal to at least partially remove an effect of at least said receiver filter on the multi-path profile, where said unit is further configured to at least partially remove an effect of a transmitter filter on the multi-path profile and to use a least squares criterion to derive the radio channel multi-path profile x from a searcher profile y, where y=F·x+v, where v is a noise vector and F is a transmit/receive matrix.

16. The apparatus as in claim 15, where vector x is derived as x=$(F^T \cdot F)^{-1} \cdot F^T \cdot y$, where T denotes a transpose operation and −1 denotes an inverse matrix operation.

17. The apparatus as in claim 16, further comprising adding a pre-whitening term to stabilize the inverse as x=$(F^T \cdot F + epsilon \cdot I)^{-1} \cdot F^T \cdot y$.

18. The apparatus as in claim 15, using L1 norm instead of L2 norm in the least squares derivation.

19. A mobile station, comprising:
a control function;
a receiver comprising a receiver front end configured to receive a code division multiple access signal from a radio channel, said receiver front end comprising at least one receiver filter;
a searcher having an input coupled to an output of the receiver front end for inputting a received signal and having an output for outputting a digital representation of a radio channel multi-path profile to said control function; and
a unit configured to at least partially remove, at least partially via deconvolution, an effect of at least said receiver filter on the multi-path profile, where said unit comprises a filter having a filter characteristic that approximates an inverted response of at least said receiver filter.

20. A mobile station as in claim 19, where said unit is further configured to at least partially remove an effect of a base station transmitter filter on the multi-path profile.

21. A mobile station as in claim 19, where said control function is configured to use the multi-path profile when making demodulator finger assignments.

22. A mobile station, comprising:
a control function;
a receiver comprising a receiver front end configured to receive a code division multiple access signal from a radio channel, said receiver front end comprising at least one receiver filter;
a searcher having an input coupled to an output of the receiver front end for inputting a received signal and having an output for outputting a digital representation of a radio channel multi-path profile to said control function; and
a unit configured to at least partially remove, at least partially via deconvolution, an effect of at least said receiver filter on the multi-path profile, said unit comprising a processor that is configured to use a least squares criterion to derive the radio channel multi-path profile x from a searcher profile y, where y=F·x+v, where v is a noise vector and F is a transmit/receive matrix.

23. A mobile station as in claim 22, where vector x is derived as x=$(F^T \cdot F)^{-1} \cdot F^T \cdot y$, where T denotes a transpose operation and −1 denotes an inverse matrix operation.

24. A mobile station as in claim 23, wherein the unit is further configured to add a pre-whitening term to stabilize the inverse as x=$(F^T \cdot F + epsilon \cdot I)^{-1} \cdot F^T \cdot y$.

25. A mobile station as in claim 22, wherein the unit is configured to use L1 norm instead of L2 norm in the least squares derivation.

26. A mobile station as in claim 20, where said unit is implemented in searcher hardware.

27. A mobile station as in claim 20, where said unit is implemented in control function software.

28. An apparatus comprising a searcher and a filter, configured to
input a code division multiple access signal received through a radio channel to the searcher; and
process the received signal in the searcher to generate output data for a finger assignment algorithm that represents a multi-path profile of the radio channel, where processing comprises passing the received code division multiple access signal through the filter selected to have a filter characteristic that approximates an inverted response of a base station transmit filter and at least one mobile station receive filter so as to reduce an occurrence of multi-path sidelobes in the output data.

29. An apparatus comprising a processor unit, a receiver and a searcher, configured to receive as a received signal a code division multiple access signal through a radio channel; and process the received signal in the searcher to generate output data for a finger assignment algorithm that represents a multi-path profile of the radio channel, where processing comprises passing the received code division multiple access signal through a processor unit that operates in accordance with a least squares criterion to derive the radio channel multi-path profile x from a searcher profile y, where y=F·x+v, where v is a noise vector and F is a transmit/receive matrix, so as to reduce an occurrence of multi-path sidelobes in the output data.

30. Circuitry, comprising:

a searcher comprising an input configured to receive a code division multiple access signal from a receiver front end, the searcher further comprising an output configured to output a digital representation of a radio channel multi-path profile of the received code division multiple access signal, said searcher further comprising a deconvolution processing block configured to process the received code division multiple access signal to at least partially remove an effect of at least a receiver filter in the receiver front end on the multi-path profile, the deconvolution processing block comprising a filter having a filter characteristic that approximates an inverted amplitude response of at least said receiver filter.

31. Circuitry as in claim 30, where said deconvolution processing block is also configured to process the received code division multiple access signal to at least partially remove an effect of a transmitter filter on the multi-path profile.

32. Circuitry as in claim 30, where said circuitry is an integrated circuit.

33. Circuitry as in claim 31, where the filter has a filter characteristic that approximates an inverted response of said receiver filter and said transmitter filter.

34. A method as in claim 1, where the filter is selected to have a filter characteristic that approximates an inverted amplitude or power response of the transmit filter and the receive filter.

35. A memory storing a program that when executed by a processor results in actions comprising:

receiving as a received signal a code division multiple access signal through a radio channel; and processing the received signal to obtain a multi-path profile of the radio channel, where processing comprises at least partially removing an effect of a transmit filter and a receive filter on the multi-path profile.

36. The memory of claim 35 wherein the processing uses a least squares criterion to derive the radio channel multi-path profile x from a searcher profile y, where y=F·x+v, where v is a noise vector and F is a transmit/receive matrix.

37. The memory of claim 36 where the actions further comprise outputting the multi-path profile of the radio channel to a finger assignment unit that represents a multi-path profile of the radio channel.

* * * * *